US012671904B2

(12) United States Patent
Higuma

(10) Patent No.: US 12,671,904 B2
(45) Date of Patent: Jun. 30, 2026

(54) IMAGE PICKUP APPARATUS, LENS APPARATUS, IMAGING SYSTEM, CONTROL METHOD, AND STORAGE MEDIUM

(71) Applicant: CANON KABUSHIKI KAISHA, Tokyo (JP)

(72) Inventor: Kazuya Higuma, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 21 days.

(21) Appl. No.: 18/888,354

(22) Filed: Sep. 18, 2024

(65) Prior Publication Data

US 2025/0126362 A1     Apr. 17, 2025

(30) Foreign Application Priority Data

Oct. 11, 2023     (JP) ................................. 2023-175684

(51) Int. Cl.
*H04N 23/695*          (2023.01)
*G03B 17/14*           (2021.01)
*H04N 23/55*           (2023.01)

(52) U.S. Cl.
CPC ........... *H04N 23/695* (2023.01); *G03B 17/14* (2013.01); *H04N 23/55* (2023.01)

(58) Field of Classification Search
CPC ........ G03B 5/06; G03B 17/14; H04N 5/2628; H04N 5/2621; H04N 23/663; H04N 23/695; H04N 23/55
USPC ...................................................... 348/222.1
See application file for complete search history.

(56) References Cited

U.S. PATENT DOCUMENTS

| | | | | |
|---|---|---|---|---|
| 10,345,615 B2 * | 7/2019 | Okuda | ..................... | G03B 5/06 |
| 10,810,714 B2 * | 10/2020 | Kusumi | ................. | H04N 1/486 |
| 11,089,200 B2 * | 8/2021 | Nagano | .................. | H04N 23/67 |
| 12,513,394 B2 * | 12/2025 | Koiwai | ................ | H04N 23/671 |
| 2010/0157075 A1 * | 6/2010 | Yoshizumi | ............. | H04N 23/66 |
| | | | | 348/222.1 |
| 2017/0192247 A1 * | 7/2017 | Okuda | ................. | H04N 23/663 |
| 2019/0057494 A1 * | 2/2019 | Kusumi | ................. | H04N 1/486 |
| 2019/0199912 A1 * | 6/2019 | Nagano | .................. | H04N 23/67 |
| 2023/0305294 A1 * | 9/2023 | Kato | ................. | G02B 27/0025 |
| 2023/0314904 A1 * | 10/2023 | Mizushima | .............. | G03B 5/00 |
| | | | | 359/813 |
| 2023/0319402 A1 * | 10/2023 | Koiwai | ................ | H04N 23/671 |
| | | | | 348/345 |

FOREIGN PATENT DOCUMENTS

| | | |
|---|---|---|
| JP | 2011185999 A | 9/2011 |
| JP | 2011239346 A | 11/2011 |

* cited by examiner

*Primary Examiner* — Pritham D Prabhakher
(74) *Attorney, Agent, or Firm* — ROSSI, KIMMS & McDOWELL LLP

(57)          ABSTRACT

An image pickup apparatus is attachable to and detachable from a lens apparatus configured to provide tilt drive by an actuator. The image pickup apparatus includes an image processing unit configured to add a reverse tilt imaging effect to an image acquired through the lens apparatus using image processing, and a processor configured to determine whether to add the effect to the image using at least the image processing or at least the tilt drive.

13 Claims, 6 Drawing Sheets

IMAGE PICKUP APPARATUS, LENS APPARATUS, IMAGING SYSTEM, CONTROL METHOD, AND STORAGE MEDIUM

BACKGROUND

Technical Field

The present disclosure relates to an image pickup apparatus, a lens apparatus, an imaging system, a control method, and a storage medium.

Description of Related Art

Lens apparatuses have conventionally been known that can provide tilt imaging for entirely focusing on an object plane tilted in an optical axis direction by changing the optical axis of the imaging optical system, and reverse tilt imaging for focusing on only a part of the object plane and for defocusing other parts. Image pickup apparatuses have been known that can acquire an image having a reverse tilt imaging effect by image processing. These images are called miniature-like or diorama-like images because they make real scenery look like a miniature, and are often installed in the image pickup apparatus as a function for adding special effects to an image.

If such an interchangeable lens and an image pickup apparatus are used in combination, users might think that they do not need to add a reverse tilt imaging effect through image processing, because that effect can be obtained through tilting the optical axis of the interchangeable lens. An operation of a combination of the operation of the interchangeable lens and image processing is complicated, and it may be difficult for the user to obtain his intended effect. Accordingly, Japanese Patent Laid-Open No. 2011-239346 discloses an image pickup apparatus that prohibits the reverse tilt imaging effect through image processing in a case where an interchangeable lens that can provide the reverse tilt imaging effect is combined with the image pickup apparatus configured to provide the image processing of the reverse tilt imaging effect.

However, the image pickup apparatus disclosed in Japanese Patent Laid-Open No. 2011-239346 cannot obtain an image as intended by a user with a simple operation.

SUMMARY

An image pickup apparatus according to one aspect of the disclosure is connected to a lens apparatus configured to provide tilt drive by an actuator. The image pickup apparatus includes an image processing unit configured to add a reverse tilt imaging effect to an image acquired through the lens apparatus using image processing, and a processor configured to determine whether to add the effect to the image using at least the image processing or at least the tilt drive. An imaging system having the above image pickup apparatus also constitutes another aspect of the disclosure. A control method of the above image pickup apparatus also constitutes another aspect of the disclosure. A storage medium storing a program that causes a computer to execute the above control method also constitutes another aspect of the disclosure.

A lens apparatus according to another aspect of the disclosure is attachable to and detachable from an image pickup apparatus having an image processing unit configured to add a reverse tilt imaging effect using image processing. The lens apparatus includes an optical element, an actuator configured to move the optical element to perform tilt drive, and a processor configured to control the actuator. The image pickup apparatus determines whether to add the effect to the image using at least the image processing or at least the tilt drive. The processor is configured to control the actuator to perform the tilt drive in a case where the processor receives a signal from the image pickup apparatus instructing to perform the tilt drive to add the effect. A control method of the above lens apparatus also constitutes another aspect of the disclosure. A storage medium storing a program that causes a computer to execute the above control method also constitutes another aspect of the disclosure.

Further features of various embodiments of the disclosure will become apparent from the following description of embodiments with reference to the attached drawings.

DETAILED DESCRIPTION

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure.

Configuration of Imaging System

Figure 1:
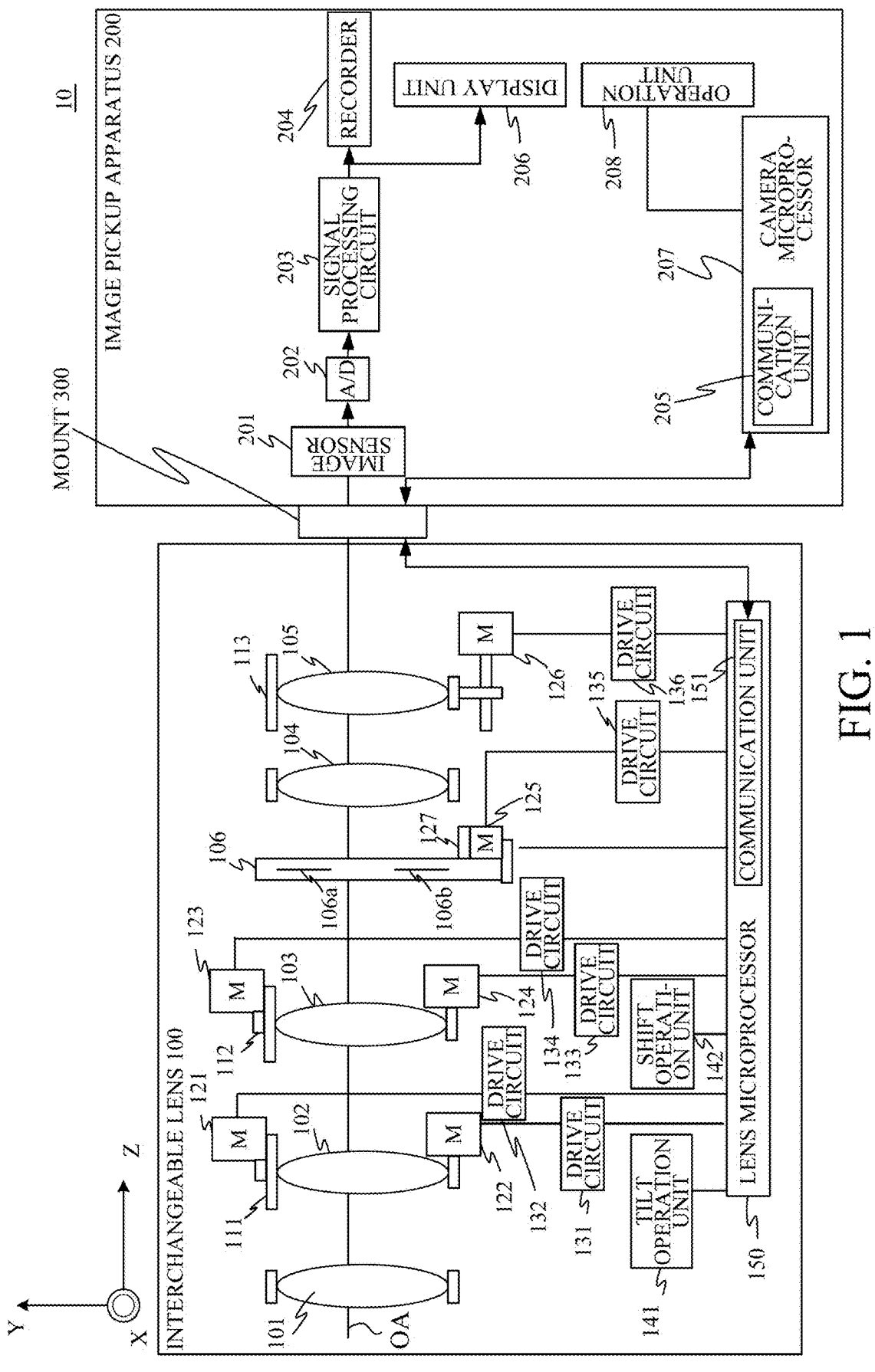
FIG. 1 is a configuration diagram of an imaging system according to each embodiment.

Referring now to FIG. 1, a description will be given of an imaging system (camera system) 10 according to each embodiment of the present disclosure. FIG. 1 is a configuration diagram of the imaging system 10. The imaging system 10 includes an interchangeable lens (lens apparatus) 100 and an image pickup apparatus (camera body) 200. The interchangeable lens 100 can be tilted (an angle between an object plane and a focal plane or the tilt of the focal plane relative to the object plane is variable) by an internal actuator, and is attachable to and detachable from the image pickup apparatus 200.

The interchangeable lens 100 includes an imaging optical system configured to form an object image. The imaging optical system includes, in order from the object side to the image side, a field lens 101, a first lens (tilt/shift lens) 102, a second lens (tilt/shift lens) 103, an aperture stop (diaphragm) unit 106, a zoom lens 104, and a focus lens 105. The first lens 102 and the second lens 103 generate a tilt effect or a shift effect. The aperture stop unit 106 adjusts a light amount. The zoom lens 104 adjusts a focal length. The focus lens 105 functions as a focusing lens. A lens configuration in which the focus lens 105 is disposed on the rear side when viewed from the object side is called a rear focus lens, and is commonly used in small lens interchangeable type cameras and compact digital cameras.

The first lens 102, the second lens 103, and the focus lens 105 are held by lens holding frames 111, 112, and 113, respectively, and are movable in each axial direction by unillustrated guide shafts. The focus lens 105 is driven in a direction along an optical axis OA (optical axis direction) by a stepping motor 126.

The first lens 102 and the second lens 103, two optical elements, are driven in the X direction and the Y direction of FIG. 1 by stepping motors (actuators) 121, 122, 123, and 124, respectively, to generate a tilt effect or a shift effect. More specifically, a tilt effect can be obtained by moving the first lens 102 and the second lens 103 in opposite directions. A shift effect can be obtained by moving the first lens 102 and the second lens 103 in the same direction. The positions of the first lens 102, the second lens 103, and the focus lens 105 are detectable by unillustrated position detection sensors.

The zoom lens 104 includes an encoder configured to detect the position of the zoom lens 104, and can detect changes in the imaging magnification or angle of view associated with zoom operations.

The stepping motors 121, 122, 123, 124, 125, and 126 are configured to move the first lens 102, the second lens 103, the focus lens 105, and the aperture stop unit 106, respectively, in synchronization with drive pulses. The stepping motors 121 to 126, together with drive circuits 131 to 136 described below, constitute a lens drive unit configured to move the first lens 102, the second lens 103, the focus lens 105, and the aperture stop unit 106.

A lens microprocessor 150 controls the overall operation of the interchangeable lens 100 according to a lens control command provided by the image pickup apparatus 200. The lens microprocessor 150 transmits various lens information to a communication unit (camera communication unit) 205 of the image pickup apparatus 200 via a communication unit (lens communication unit) 151, or receives camera information.

The drive circuits 131, 132, 133, 134, 135, and 136 drive the stepping motors 121, 122, 123, 124, 125, and 126, respectively, according to drive signals input from the lens microprocessor 150. That is, the tilt/shift operation, focusing operation, and depth/exposure adjustment operation of the imaging optical system are performed by controlling the stepping motors 121, 122, 123, 124, 125, and 126. Thus, the lens microprocessor 150 controls each motor (drive unit) by providing a drive signal to each drive circuit. The motors configured to move the first lens 102, the second lens 103, the focus lens 105, and the aperture stop unit 106 may be DC motors or ultrasonic motors that use piezoelectric elements as vibrators, and the type of actuator is not limited to these examples. The aperture stop unit 106 includes aperture blades 106a and 106b. The states of the aperture blades 106a and 106b are detected by a maximum aperture position detecting sensor 127 and input to the lens microprocessor 150. The lens microprocessor 150 outputs a control signal to the drive circuit 135 based on the input signal. The drive circuit 135 drives the stepping motor 125 based on the control signal. The maximum aperture position detecting sensor 127 includes a sensor (detector) such as a photo-interrupter, and detects whether the blades of the aperture stop unit 106 are in the maximum aperture position (where the aperture diameter is maximum).

A tilt operation unit 141 is an operation unit configured to change a tilt amount and tilt direction by user operation. A shift operation unit 142 is an operation unit configured to change a shift amount and shift direction by user operation. The first lens 102 and the second lens 103 are driven according to the operation of the tilt operation unit 141 and the shift operation unit 142 so as to acquire the tilt effect and the shift effect intended by the user.

The image pickup apparatus 200 includes an image sensor 201, an A/D conversion circuit 202, a signal processing circuit (image processing unit) 203, a memory 204, the communication unit 205, a display unit 206, a camera unit microprocessor (control unit) 207, and an operation unit 208. The image sensor 201 is a photoelectric conversion element such as a Complementary Metal-Oxide-Semiconductor (CMOS) sensor or a Charge Coupled Device (CCD) sensor. The image sensor 201 photoelectrically converts an object image (optical image) formed by the interchangeable lens 100 and outputs an electrical signal (analog signal).

The optical image that has passed through the interchangeable lens 100 is converted into an analog signal by photoelectric conversion in the image sensor 201. The A/D conversion circuit 202 converts the analog signal output from the image sensor 201 into a digital signal. The signal processing circuit 203 performs various image processing for the electrical signal (digital signal) input from the A/D conversion circuit 202. Thereby, the signal processing circuit 203 generates focus information that indicates an in-focus state of an image, detects a distance to an object, generates luminance signal information that indicates an exposure state, and converts the data into a recordable data format. The signal processing circuit 203 applies a reverse tilt imaging effect an image (captured image) acquired through the interchangeable lens 100 by image processing. The memory 204 stores an output signal (image signal) from the signal processing circuit 203.

The display unit 206 displays the object image (image signal) generated by the signal processing circuit 203. Thereby, the user can check the composition of the object image being imaged and an in-focus state in real time. The display unit 206 is a touch panel, and the user can input various information by the touch operation.

The camera microprocessor 207 controls the image pickup apparatus 200 according to an input from an unillustrated imaging instruction switch or camera setting related switch. The camera microprocessor 207 instructs the lens microprocessor (control unit) 150 to make operation requests or settings for the interchangeable lens 100, such as a request to drive the first lens 102, the second lens 103, the focus lens 105, or the aperture stop unit 106.

The operation unit 208 is a member for inputting a user operation, and includes a plurality of operation units that can be operated by the user, such as a touch panel of the display unit 206, a release button, and a dial.

First Embodiment

Figure 2:
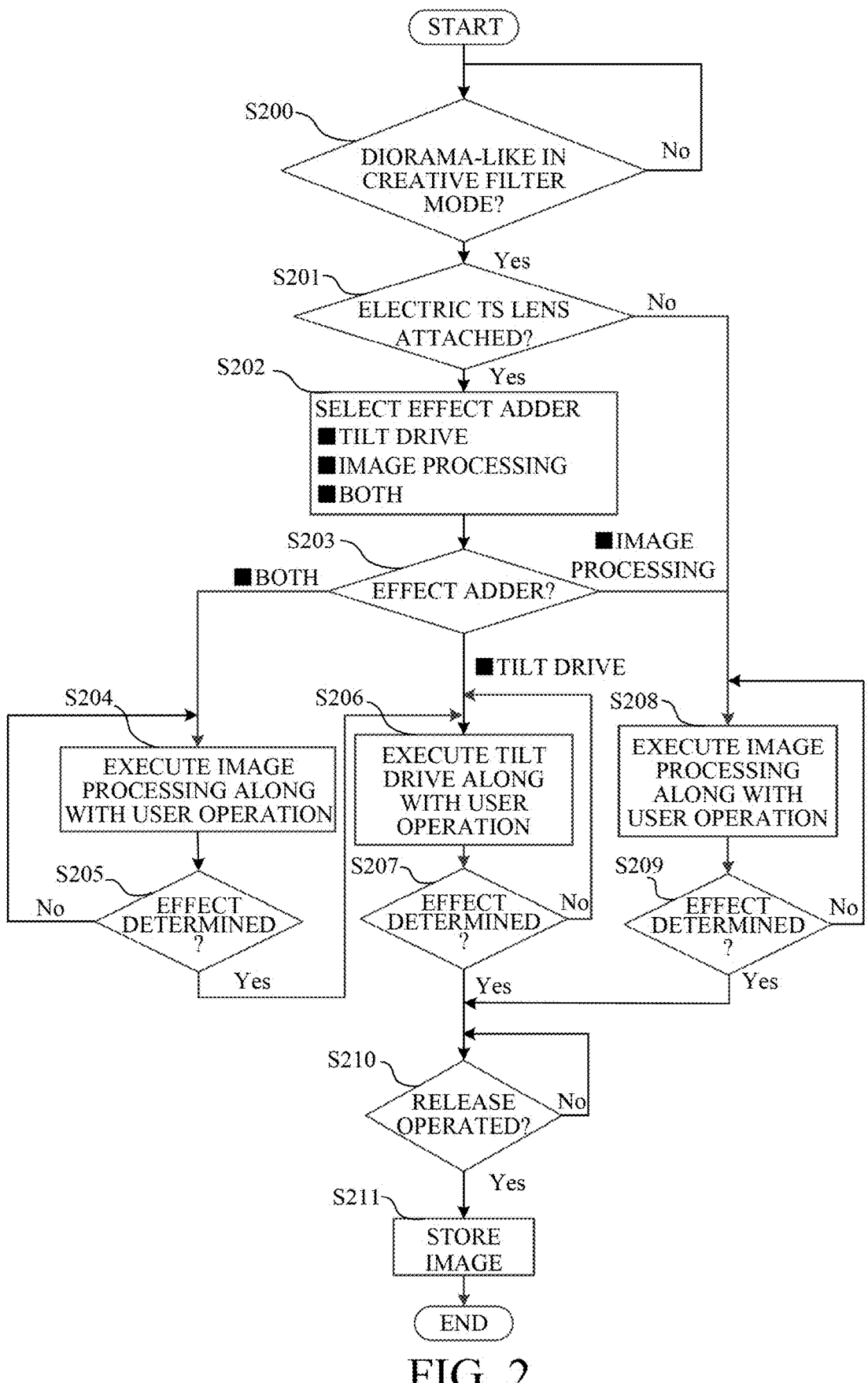
FIG. 2 is a flowchart illustrating processing of an imaging system according to a first embodiment.

Referring now to FIG. 2, a description will be given of processing of the imaging system 10 according to the first embodiment. FIG. 2 is a flowchart illustrating the processing of the imaging system 10 according to this embodiment. This processing starts when the image pickup apparatus 200 is powered on or the interchangeable lens 100 is attached to the image pickup apparatus 200.

First, in step S200, the image pickup apparatus 200 is switched to a mode for adding a special effect during imaging (a mode for adding a reverse tilt imaging effect, a creative filter mode) by a user operation. Then, the camera microprocessor 207 determines whether or not a "diorama style" that adds the effect of reverse tilt imaging has been selected in that mode. In a case where the "diorama style" has been selected, the flow proceeds to step S201. On the other hand, in a case where the "diorama style" has not been selected, the determination of step S200 is repeated.

Here, tilt imaging is imaging for entirely focusing on an object plane tilted in the optical axis direction by changing the optical axis OA of the imaging optical system. Reverse tilt imaging is imaging for focusing on only a part of the object plane and for defocusing the other areas, contrary to tilt imaging. In other words, the reverse tilt imaging corresponds to imaging for tilting the focal plane relative to the object plane.

In step S201, the camera microprocessor 207 determines whether the interchangeable lens attached to the image pickup apparatus 200 is an electric tilt/shift (TS) lens. Here, the electric TS lens is a lens apparatus that can be tilted and shifted by an actuator in the interchangeable lens, and corresponds to the interchangeable lens 100 in this embodiment. The interchangeable lens 100 and the image pickup apparatus 200 are communicable with each other via the communication units 151 and 205, and transmit information about the interchangeable lens 100 to the image pickup apparatus 200. Based on that information, the image pickup apparatus 200 determines whether the attached interchangeable lens is an electric TS lens. In a case where the electric TS lens is attached, the flow proceeds to step S202. On the other hand, in a case where the electric TS lens is not attached, the flow proceeds to step S208, to add the effect using image processing.

In step S202, the camera microprocessor 207 selects (determines) a method for adding a diorama-like effect using the effect adder (effect adding unit). In this embodiment, the effect adder displays three options on the display unit 206 as a method for adding a diorama-like effect: a method using image processing of the image pickup apparatus 200, a method using tilt drive of the electric TS lens, or a method using both image processing and tilt drive. The camera microprocessor 207 can select one of the three options according to a signal obtained from the operation unit 208 by the user operating the operation unit 208.

Next, in step S203, the camera microprocessor 207 branches into the next operation according to the effect adder selected in step S202. In a case where the method using both the image processing and the tilt drive is selected, the flow proceeds to step S204. In a case where the method using the tilt drive is selected, the flow proceeds to step S206. In a case where the method using the image processing is selected, the flow proceeds to step S208.

Figure 4:
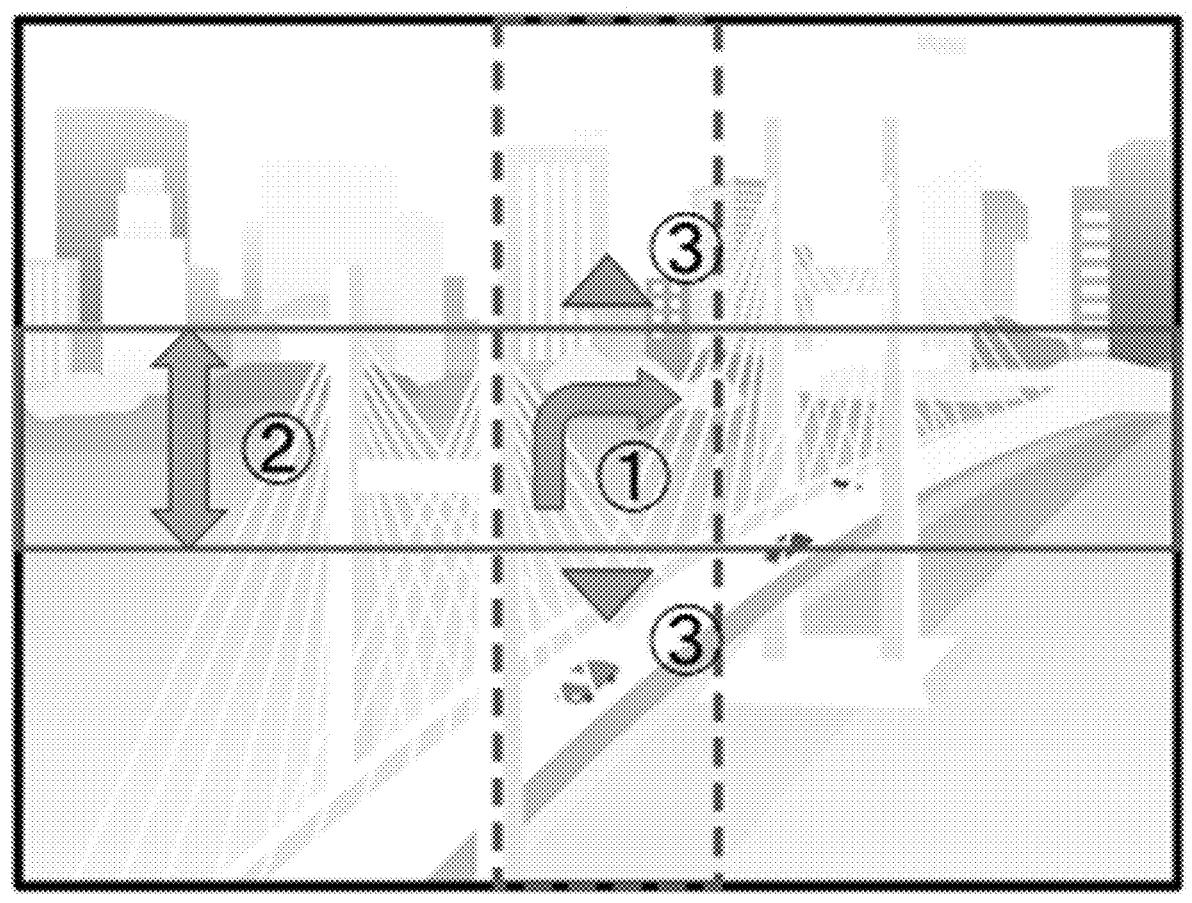
FIG. 4 explains a display screen of a display unit according to each embodiment.

In a case where "the method using both the image processing and the tilt drive" is selected as the effect adder, in step S204, the camera microprocessor 207 adds the effect using the image processing according to the user operation. FIG. 4 explains the display screen of the display unit 206 at this time. A display for operating an area to be focused as illustrated in FIG. 4 is displayed on the display unit 206, and the user adjusts the area to be focused according to the display. In this embodiment, each of (vertical and horizontal) directions of the area to be focused illustrated in FIG. 4 (1), the width of the area illustrated in FIG. 4 (2), and the position of the area illustrated in FIG. 4 (3) can be changed by the user operation.

Next, in step S205, in a case where the area to be focused on is determined by the user operation (in a case where the effect is determined), the flow proceeds to step S206. On the other hand, in a case where the area to be focused on is not determined, the flow returns to step S204, and the user operation for adjustment continues.

In a case where "tilt drive" as the effect adder is selected, or in a case where "both image processing and tilt drive" is selected and the effect of image processing is determined, the flow proceeds to step S206. In step S206, as in step S204, a display for operating the area to be focused on as illustrated in FIG. 4 is displayed on the display unit 206, and the user adjusts the area to be focused on according to the display. In this embodiment, each of the (vertical and horizontal) directions of the area to be focused on illustrated in FIG. 4 (1), the width of the area to be focused on illustrated in FIG. 4 (2), and the position of the area to be focused on illustrated in FIG. 4 (3) can be changed by the user operation.

Here, the tilt position is moved to adjust the position to be focused. Depending on the tilt drive direction, the entire screen may be in focus. Therefore, in order to determine a direction for the reverse tilt imaging effect, the defocus information on the entire screen is used.

Figure 5:
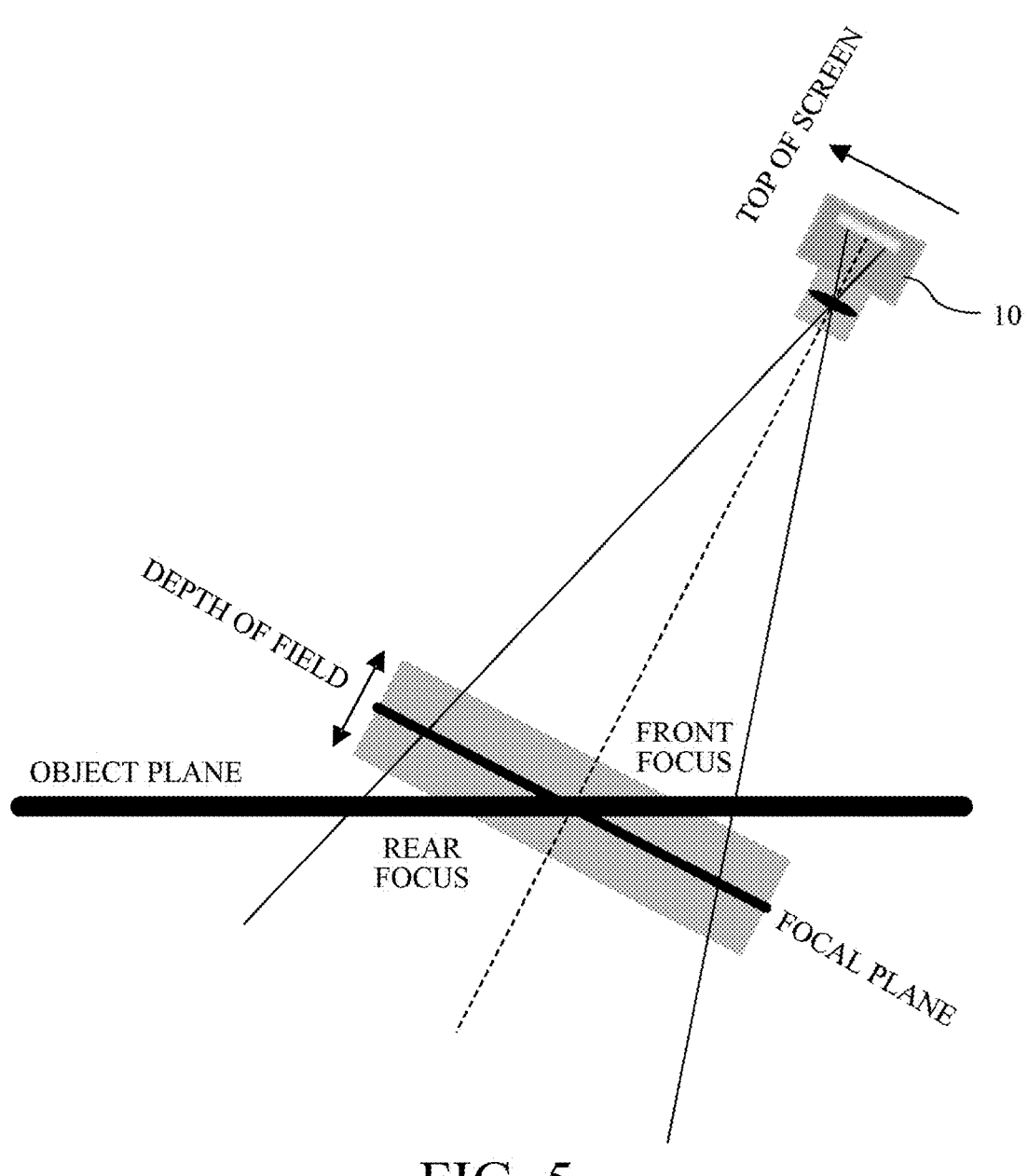
FIG. 5 illustrates a relationship between an object, the imaging system, and a focal plane in each embodiment.
Figure 6:
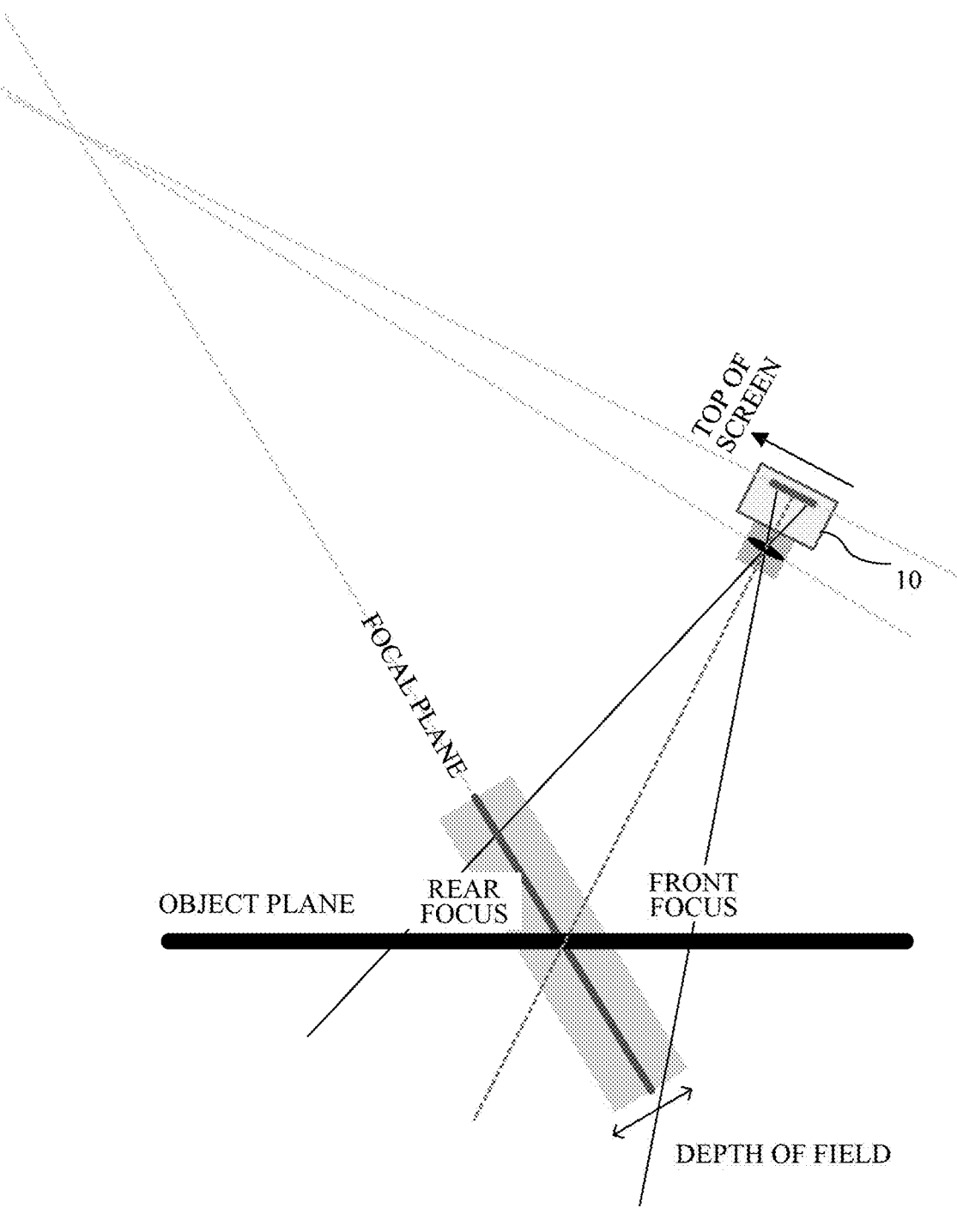
FIG. 6 illustrates a relationship between the object, the imaging system, and the focal plane in each embodiment.

FIGS. 5 and 6 illustrate a relationship between the object, the imaging system 10, and the focal plane. In a case where the imaging system 10 and the object have the positional relationship illustrated in FIG. 5, the defocus information illustrates that the lower side of the screen is front focus and the upper side of the screen is rear focus. In this case, the tilt drive direction is driven in a direction in which the lower side of the screen is more front-focused and the upper side of the screen is more rear-focused. As a result, the object and focal plane have the relationship illustrated in FIG. 6, and an image can be obtained in which the area other than the focused screen center is largely defocused (degraded). In this embodiment, the tilt drive direction may be determined by the user operation without using the defocus information.

Next, in step S207 of FIG. 2, in a case where the area to be focused on is determined by the user operation (in a case where the effect is determined), the flow proceeds to step S210. On the other hand, in a case where the area to be focused on has not been determined, the flow returns to step S206.

In a case where an interchangeable lens other than an electric TS lens is attached to the image pickup apparatus 200, or in a case where the method using the "image processing" is selected as the effect adder, the flow proceeds to step S208.

In step S208, as in step S204, a display for operating the area to be focused on as illustrated in FIG. 4 is displayed on the display unit 206, and the user adjusts the area to be focused on according to the display. In this embodiment, each of the (vertical and horizontal) directions of the area to be focused on illustrated in FIG. 4 (1), the width of the area illustrated in FIG. 4 (2), and the position of the area illustrated in FIG. 4 (3) can be changed by the user operation. The image processing in step S208 is performed while the first lens 102 and the second lens 103 of the interchangeable lens 100 are fixed, similarly to step S204.

Next, in step S209, in a case where the area to be focused on is determined by the user operation (in a case where the effect is determined), the flow proceeds to step S210. On the other hand, in a case where the area to be focused on has not been determined, the flow returns to step S208.

In step S210, the camera microprocessor 207 determines whether or not the user has performed a release operation (to operate the release button included in the operation unit 208). In a case where the release operation has not been performed, step S210 is repeated. On the other hand, in a case where the release operation has been performed, the flow proceeds to step S211. In step S211, the camera microprocessor 207 performs an imaging operation and stores a captured image in the memory 204. This flow thus ends.

In this embodiment, in order to obtain the "diorama-like" effect, the user can select a method for adding the effect (effect adder), and can easily add the effect by simply operating according to the displayed content.

Second Embodiment

Figure 3:
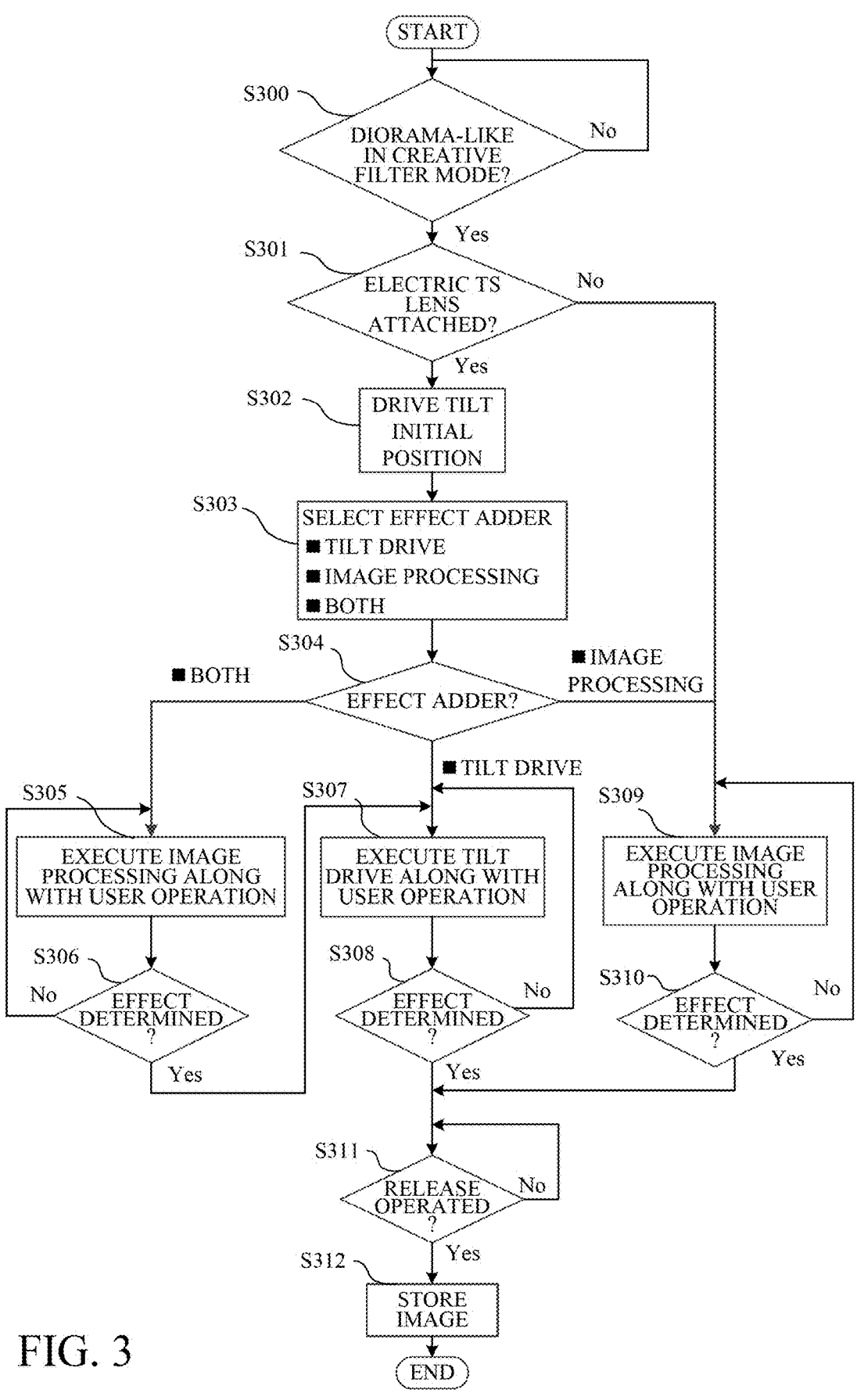
FIG. 3 is a flowchart illustrating processing of an imaging system according to a second embodiment.

Referring now to FIG. 3, a description will be given of processing of an imaging system 10 according to a second embodiment. FIG. 3 is a flowchart illustrating the processing of the imaging system 10 according to this embodiment. Steps S300, S301, and S303 to S312 in FIG. 3 correspond to steps S200 to S211 in FIG. 2, respectively, and thus a description thereof will be omitted.

In step S302, the camera microprocessor 207 drives the tilt position of the interchangeable lens 100 to the initial position (reference position). Here, the initial position is a position where the lens principal plane is parallel to the imaging surface (surface of the image sensor 201) as illustrated in FIG. 5. At this position, there is no tilt effect, and the focal plane is parallel to the imaging surface. By returning the tilt position to the initial position before the effect is added, the added effect can be easily recognized.

Actual tilt drive is performed, for example, as follows. Communication is performed from the image pickup apparatus 200 to the interchangeable lens 100 via the communication units 205 and 151, and the camera microprocessor 207 sends a command to the interchangeable lens 100 to drive the tilt position to the initial position. The lens microprocessor 150 calculates the drive amounts of the first lens 102 and the second lens 103 required to move them from their current positions to their initial positions. The lens microprocessor 150 then drives the drive circuits 131 to 134 and the stepping motors 121 to 124 by the calculated drive amount. After driving is completed, the interchangeable lens 100 communicates to the image pickup apparatus 200 via the communication units 151 and 205 that driving has been completed. The operation of driving the tilt position to the initial position is thus completed.

In this embodiment, the tilt position of the interchangeable lens 100 is driven to the initial position having no tilt effect before the diorama-like effect is added. Therefore, the user can confirm an image before the effect is added, and can add the effect from this state. Therefore, he can easily create an intended image.

In each embodiment, the user can determine a method for obtaining the reverse tilt imaging effect. Thus, for example, for his image expression, he can use the tilt mechanism of the interchangeable lens and further add the reverse tilt imaging effect to an image to which a tilt imaging effect has already added by the image processing technology. In addition, in adding the effect using both methods, for example, he can obtain an image in which only an area where the horizontal and vertical directions intersect is in focus, by adding a horizontal reverse tilt imaging effect through tilt drive and a vertical effect by image processing.

OTHER EMBODIMENTS

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has described example embodiments, it is to be understood that some embodiments are not limited to the disclosed embodiments. The scope of the following claims is to be accorded the broadest interpretation so as to encompass all such modifications and equivalent structures and functions.

Each embodiment can provide an image pickup apparatus that allows a user to obtain an intended image with a simple operation.

This application claims priority to Japanese Patent Application No. 2023-175684, which was filed on Oct. 11, 2023, and which is hereby incorporated by reference herein in its entirety.

What is claimed is:

1. An image pickup apparatus connectable to a lens apparatus, the lens apparatus being configured to add a reverse tilt imaging effect by providing tilt drive by an actuator of the lens apparatus, the image pickup apparatus comprising:

an image processing unit configured to add the reverse tilt imaging effect to an image, acquired through the lens apparatus, using image processing; and a processor configured to determine whether to add the reverse tilt imaging effect to the image using at least the image processing or at least the tilt drive.

2. The image pickup apparatus according to claim 1, wherein the processor is configured to determine whether to add the reverse tilt imaging effect to the image using only the image processing, only the tilt drive, or both the image processing and the tilt drive.

3. The image pickup apparatus according to claim 2, wherein in a case where the processor determines that the reverse tilt imaging effect is to be added using only the image processing, the processor is configured to add the reverse tilt imaging effect through the image processing of the image processing unit while fixing an optical element of the lens apparatus, and wherein in a case where the processor determines that the reverse tilt imaging effect is to be added using only the tilt drive, the processor is configured to perform the tilt drive without performing the image processing.

4. The image pickup apparatus according to claim 3, wherein in a case where the processor determines that the reverse tilt imaging effect is to be added using both the image processing and the tilt drive, the processor is configured to add the reverse tilt imaging effect through one of the image processing and the tilt drive, and then add the reverse tilt imaging effect through the other of the image processing and the tilt drive.

5. The image pickup apparatus according to claim 2, wherein in a case where the processor determines that the reverse tilt imaging effect is to be added using both the image processing and the tilt drive, the processor is configured to add the reverse tilt imaging effect through the image processing and then add the reverse tilt imaging effect through the tilt drive.

6. The image pickup apparatus according to claim 1, wherein before the reverse tilt imaging effect is added, the processor is configured to move a tilt position of the lens apparatus to a position where a lens principal plane of the lens apparatus is parallel to an imaging surface.

7. The image pickup apparatus according to claim 1, further comprising an operation unit operable by a user, wherein the processor is configured to determine a method of adding the reverse tilt imaging effect according to a signal obtained from the operation unit.

8. An imaging system comprising:

a lens apparatus configured to tilt drive by an actuator; and the image pickup apparatus according to claim 1.

9. A lens apparatus attachable to and detachable from an image pickup apparatus having an image processing unit configured to add a reverse tilt imaging effect using image processing, the lens apparatus comprising:

an optical element;

an actuator configured to move the optical element to perform tilt drive; and a processor configured to control the actuator, wherein the image pickup apparatus determines whether to add the reverse tilt imaging effect to the image using at least the image processing or at least the tilt drive, and wherein the processor is configured to control the actuator to perform the tilt drive in a case where the processor receives a signal from the image pickup apparatus instructing to perform the tilt drive to add the reverse tilt imaging effect.

10. A control method for an image pickup apparatus connectable to a lens apparatus, the lens apparatus being configured to add a reverse tilt imaging effect by providing tilt drive by an actuator of the lens apparatus, the control method comprising:

determining whether to add the reverse tilt imaging effect using at least image processing to an image acquired through the lens apparatus, or to add the reverse tilt imaging effect using at least the tilt drive; and adding the reverse tilt imaging effect according to a result of the determining.

11. A non-transitory computer-readable storage medium storing a program that causes a computer to execute the control method according to claim 10.

12. A control method for a lens apparatus attachable to and detachable from an image pickup apparatus that includes an image processing unit configured to add a reverse tilt imaging effect using image processing, the control method comprising:

receiving a signal from the image pickup apparatus instructing to move an optical element to perform tilt drive in order to add the reverse tilt imaging effect; and controlling an actuator to perform the tilt drive according to the signal, wherein the signal is received in accordance with a determination of the image pickup apparatus as to whether to add the reverse tilt imaging effect, using at least the image processing, to an image acquired by the image pickup apparatus through the lens apparatus, or to add the reverse tilt imaging effect using at least the tilt drive.

13. A non-transitory computer-readable storage medium storing a program that causes a computer to execute the control method according to claim 12.

* * * * *